United States Patent [19]

Helmberger et al.

[11] 4,017,891
[45] Apr. 12, 1977

[54] METHOD AND EQUIPMENT FOR LINE-BY-LINE RECORDING OF COLOR COMPONENT IMAGES ON A REPRODUCTION CARRIER

[75] Inventors: Josef Helmberger, Munich; Klaus Stadler, Irschenhausen, both of Germany

[73] Assignee: AGFA-Gevaert, A.G., Leverkusen, Germany

[22] Filed: Sept. 10, 1975

[21] Appl. No.: 611,976

[30] Foreign Application Priority Data

Sept. 11, 1974 Germany .......................... 2443378

[52] U.S. Cl. ........................................ 358/6; 358/8
[51] Int. Cl.$^2$ ...................... H04N 5/84; H04N 5/76
[58] Field of Search ................................ 358/4, 6, 8

[56] References Cited

UNITED STATES PATENTS

| | | | |
|---|---|---|---|
| 3,733,432 | 5/1973 | Arimura et al. | 358/8 |
| 3,783,185 | 1/1974 | Spaulding | 358/6 |
| 3,795,761 | 3/1974 | Metzger | 358/6 |

*Primary Examiner*—Robert L. Griffin
*Assistant Examiner*—Aristotelis M. Psitos
*Attorney, Agent, or Firm*—Michael J. Striker

[57] ABSTRACT

A first, second and third color component image are each recorded line-by-line on a reproduction carrier during scanning of the original as the reproduction carrier is transported past a first, second and third recording station respectively. The recording is achieved by an intensity modulated beam deflected in a direction perpendicular to the direction of transport. To superimpose the second and third color component image exactly onto the first color component image, a mark is created either at the first recording station or prior to the time the reproduction carrier arrives at the first recording station. The mark is sensed at least at the second and third recording station and a sawtooth generator started when the mark is sensed and stopped with the vertical trigger pulse of the beam deflection system used to adjust the position of the beam in the direction of transport of the reproduction carrier. In the line direction the starting position of the beam is controlled by a position signal having an amplitude corresponding to the distance in the horizontal direction between the mark and the start of a line of the first color component image.

24 Claims, 8 Drawing Figures

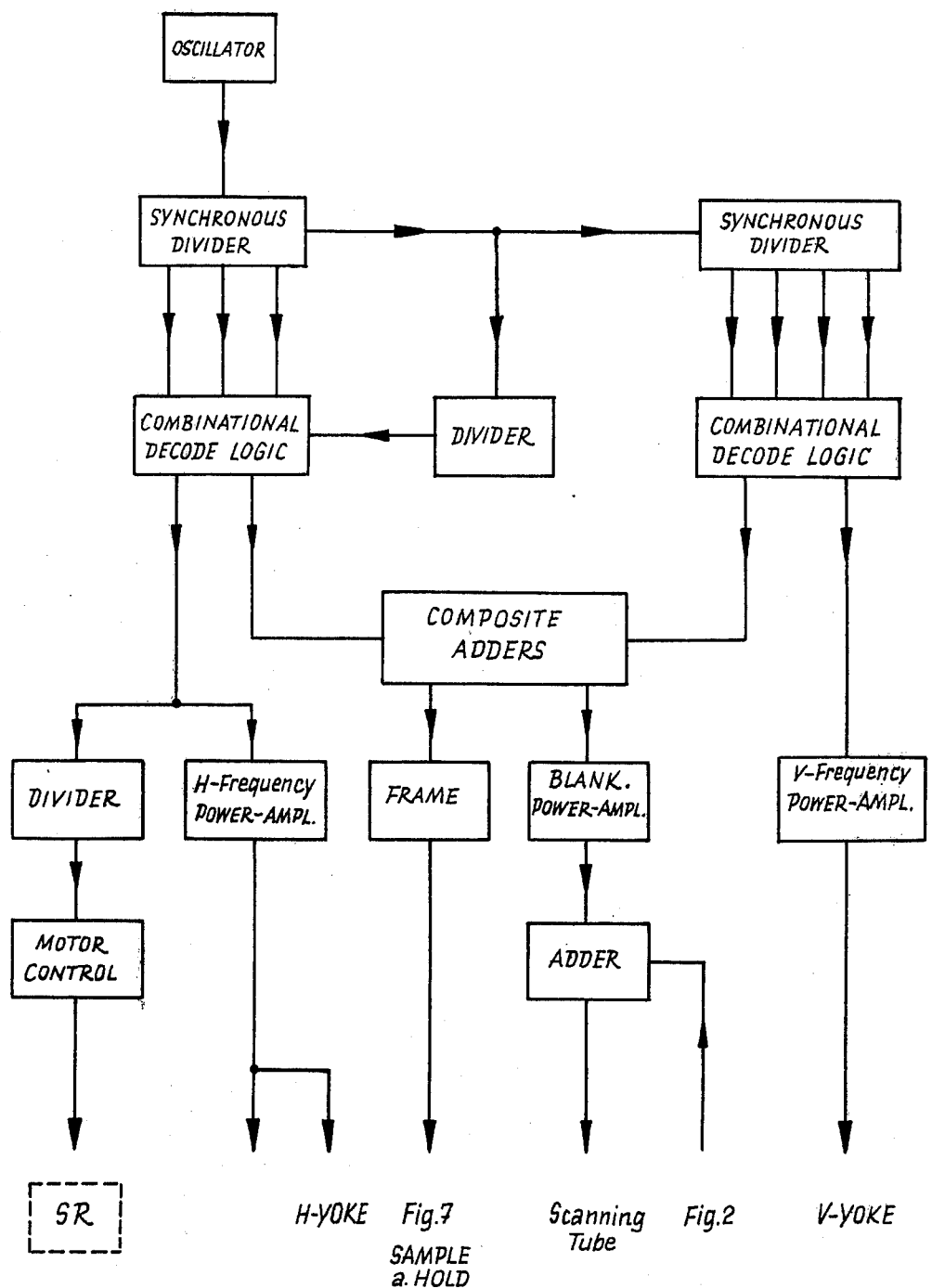

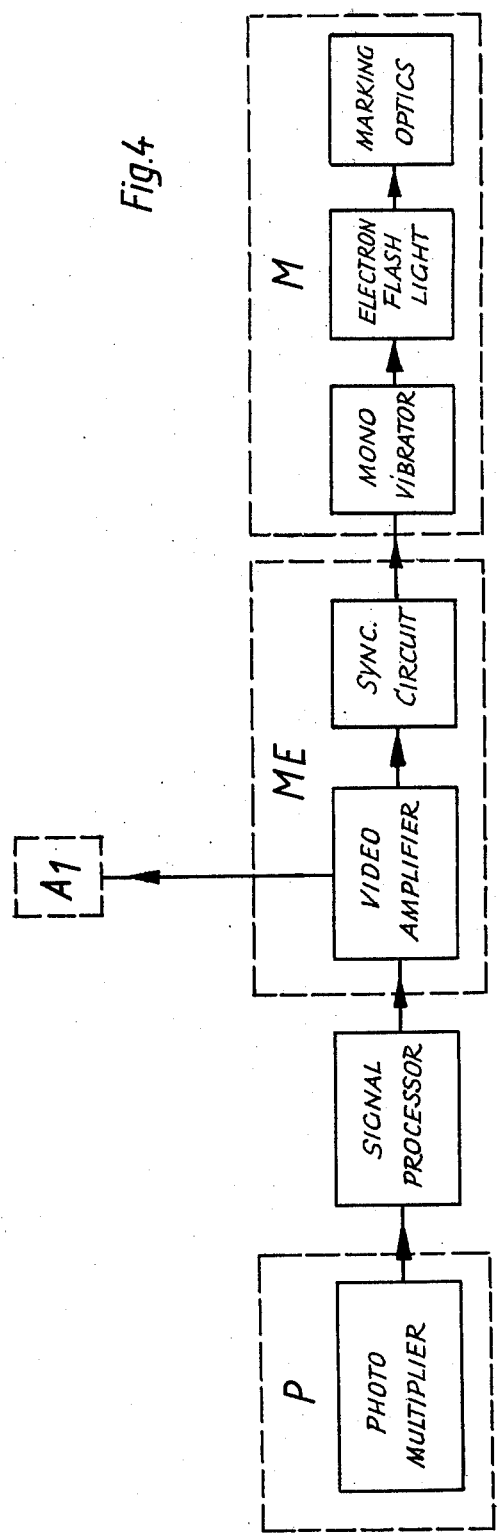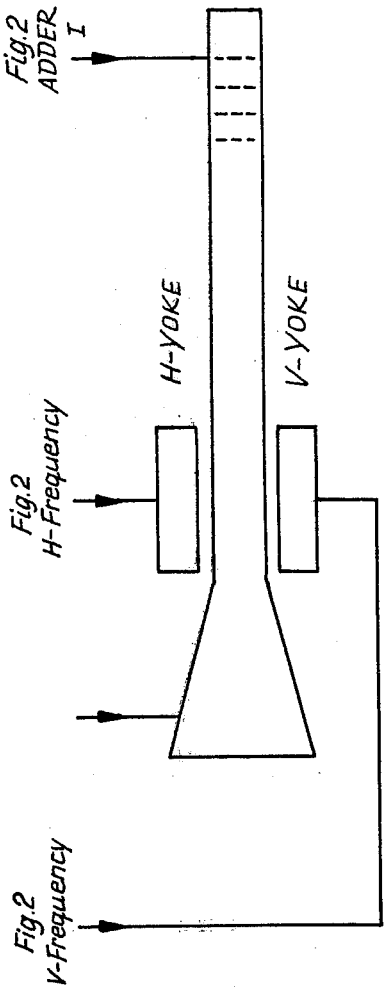

METHOD AND EQUIPMENT FOR LINE-BY-LINE RECORDING OF COLOR COMPONENT IMAGES ON A REPRODUCTION CARRIER

BACKGROUND OF THE INVENTION

The present invention relates to a method and equipment for line-by-line recording of color component images by means of a controlled beam onto a reproduction carrier. The recording of different color component images occurs at recording stations separated from each other by at least one additional processing station.

When a plurality of color component images together constituting a reproduction of a color picture is recorded by means of a laser during continual transport of the reproduction carrier past the recording station, it is of course difficult to achieve exact superposition or registry of the color component images with each other. This is particularly difficult since each color component image must be developed prior to the recording of the next subsequent color component image. The first, second and third color component images can be displaced laterally in the line direction (i.e. horizontally displaced) from each other and/or vertically displaced from each other, that is in direction of transport of the reproduction carrier. These errors in registry can result in the creation of disturbing color fringes in the final color copy. They further decrease the possible resolution of the color reproduction.

The horizontal displacement between the various color component images and a part of the vertical displacement results from tolerances in the transport of the reproduction carrier. The main part of the lack of registry in the vertical direction is due to the rigid time coupling between scanning and recording which is not accompanied by an equally rigid coupling between the scanning and the reproduction carrier transport.

In practice it has been found that to create an acceptable reproduction, the maximum allowable lack of registry between different color component images is one-tenth of a millimeter. In electrophotographic recording equipment the distance between the recording stations is in the order of 1 meter. Since the reproduction carrier must be developed, fixed and recharged within this distance, the above-mentioned tolerance cannot be maintained.

SUMMARY OF THE INVENTION

It is an object of the present invention to furnish a method and equipment for achieving the exact registry among color component images in spite of the relatively large distances between the recording stations whereat such color component images are recorded on the reproduction carrier.

The present invention resides in a method for line-by-line recording of color component images on a reproduction carrier by means of a controlled beam. The recording of a first color component image takes place at a first recording station and the recording of a second color component image takes place at a second recording station separated from said first recording station by at least one further processing station. The present invention comprises the steps of creating a mark on said reproduction carrier indicative of the position of said first color component image. It further comprises the step of sensing said mark at at least said second recording station and creating a position signal corresponding to the position of said mark relative to a determined position. It further comprises the step of fine-positioning the raster of said beam at said second recording station in accordance with said position signal.

In a preferred embodiment of the present invention the mark is created at said first recording station and is therefore indicative of the actual position of said color component image. The sensing of the mark and the creation of a position signal then takes place only at the second recording station. In another preferred embodiment, the mark is created on the reproduction carrier prior to the first recording station, the mark then being sensed and a position signal being created at the first recording station as well. In this embodiment, fine positioning of the beam in accordance with the position signal also takes place at the first recording station.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a block diagram of the electronic control circuit of FIG. 1;

FIG. 2a is a schematic diagram of the scanning tube of FIG. 1;

FIG. 4 is a more detailed block diagram of units $ME_1$ and M of FIG. 1;

DESCRIPTION OF THE PREFERRED EMBODIMENT

Figures 1, 3:
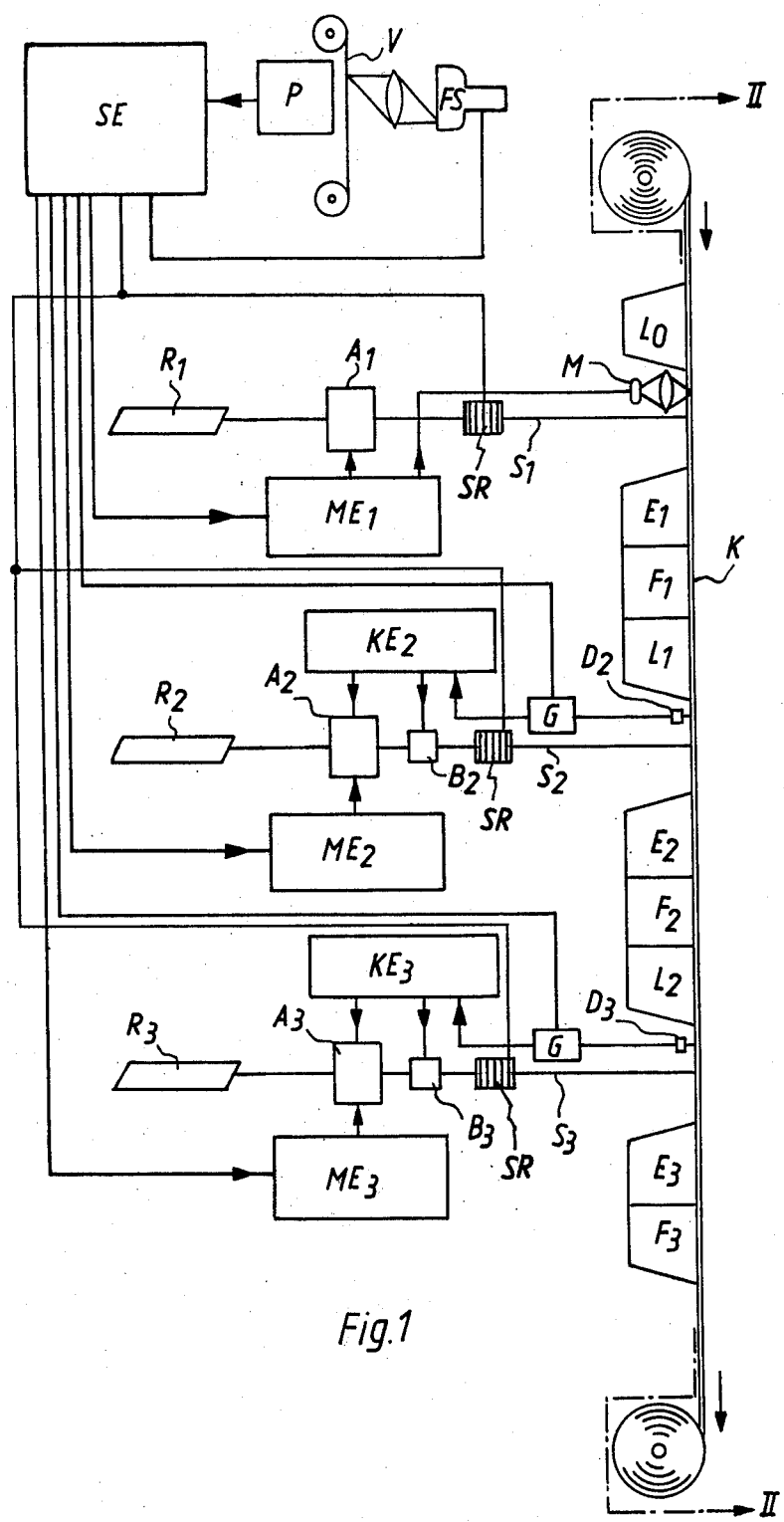
FIG. 1 is an overall block diagram showing the equipment in accordance with the present invention.
FIG. 3 is a top view of the reproduction carrier shown in FIG. 1.

A preferred embodiment of the present invention will now be described with reference to the drawing.

FIG. 1 is an overall block diagram showing equipment for sequentially recording color component images onto a reproduction carrier denoted by K in FIG. 1. An original, denoted by V, is scanned by means of a controlled beam (flying spot) furnished by a scanning tube FS. The tube is shown in greater detail in FIG. 2a. It comprises the standard H yoke for horizontal deflection, a V yoke for vertical deflections and has an intensity modulation input denoted by I. The line raster created by the tube is projected onto the original V. Photoelectric transducer circuitry denoted by P furnishes a video signal corresponding to the transparency of the original. In a preferred embodiment of the present invention, the phototransducer circuits comprise a photomultipler and a signal processor in which the video signal is processed in known fashion to effect corrections for gamma control, clamping, etc. As shown in FIG. 4, the so-processed signal is applied to a modulator control unit $ME_1$ which includes a video amplifier. Units ME$_2$ and ME$_3$ shown in the other channels of the equipment also contain a video amplifier. However, unit ME$_1$ also contains a synchronizing circuit for energizing marker means M which will be discussed in greater detail below. The signals from units ME$_1$, ME$_2$ and ME$_3$ are applied, respectively, to intensity modulator units A1, A2 and A3. Units A1, A2 and A3 modulate the intensity of three laser beams S1, S2 and S3, respectively. The laser beams S1, S2 and S3 can be generated by three different lasers R1, R2 and R3 as shown, or may be generated by a single laser.

The so-modulated laser beams S1, S2 and S3 are deflected in a direction perpendicular to the direction of transport of the reproduction carrier by a mirror drum SR. It should be noted that the direction of deflection of the beam is herein referred to also as the horizontal direction or the line direction. Similarly the direction of transport of the reproduction carrier is herein referred to also as the vertical direction.

The reproduction carrier K is transported continuously past the first, second and third reproduction station. The modulated beam S1 creates the first color component image. The reproduction carrier, which has previously been charged in a charging station L$_o$, is developed in a first developing station, E$_1$, following exposure to beam S$_1$. It is then fixed at a fixing station F$_1$ and recharged at a station L$_1$. The process repeats at the second and third recording station until all three color component images have been exposed on the reproduction carrier. The actual processing of the reproduction carrier is not a part of the present invention and is therefore not described in any detail.

The distance between the sequential recording stations is, as previously mentioned, of the order of magnitude of 1 meter. The reproduction carrier is highly stressed by the heating which is part of the fixing process and thus distorts noticeably, so that the above-mentioned tolerances of 1/10 millimeter, that is 1/100 of 1% cannot be maintained.

FIG. 3 shows a top view of the reproduction carrier K including the different locations in which the different color component images are exposed or recorded. In this connection it should be noted that the means by which it is possible to fill in the empty spaces between the color component images illustrated in FIG. 3 are not a part of the present invention.

As shown in FIG. 1, the scanning and reproducing processes are synchronized by an electronic control circuit SE, which is shown in greater detail in FIG. 2. It comprises a quartz oscillator which, by means of synchronous frequency dividers and suitable logic circuits creates the horizontal synchronizing signals and the vertical synchronizing signals to be applied to sawtooth voltage generators whose output is in turn applied to the horizontal and vertical deflection coils of the tube shown in FIG. 2a. Further, unit SE also furnishes synchronizing signals to a motor controlling the deflection of a mirror drum SR which deflects the light beam onto the reproduction carrier in the first channel. Unit SE also furnishes blanking signals to the intensity-control circuit of scanning tube FS.

In order to achieve good registration among the color component images a mark Ma is recorded on the reproduction carrier K. In the embodiment shown in FIG. 1, the mark is recorded at the first recording station by marking means M. These are shown in FIG. 4 to contain a monostable multivibrator which, when changing state, ignites an electronic flash which, through marking optics creates the mark on reproduction carrier K. This takes place prior to the beginning of recording of the first color component image at this station.

The mark Ma is developed at the same time as the developing of the first color component image takes place and is sensed in the second and third recording station by photoelectric detectors D2 and D3, respectively. The signal signifying the sensing of the mark is applied to correction circuits KE2 and KE3, respectively. Correction circuits KE2 and KE3 respectively furnish position signals to acousto-optical modulators A2 and A3 which in known fashion can also be used as deflection control units. Further, correction circuits KE2 and KE3 also furnish signals to additional deflection units B2 and B3, respectively so that the deflection of the beam is controlled in two orthogonal coordinates.

Figure 5:
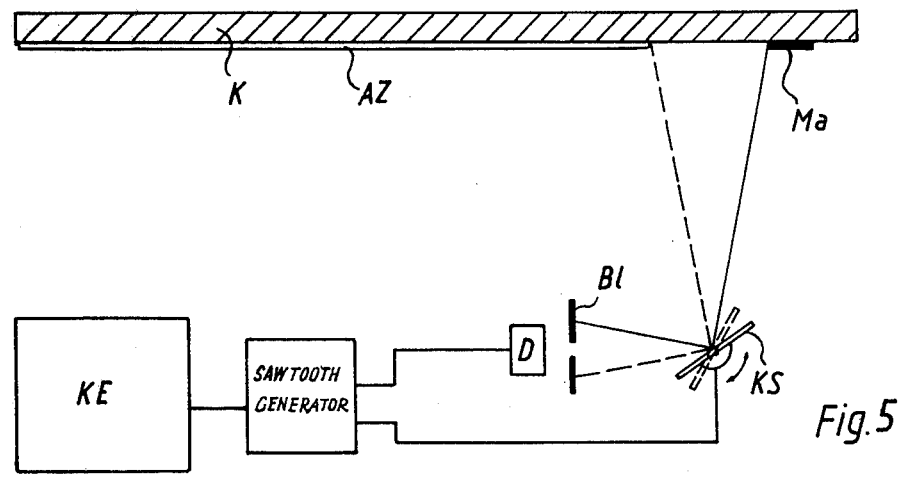
FIG. 5 is an overall block diagram showing one embodiment of means for sensing the mark and furnishing a position signal.

FIG. 5 shows one embodiment of the means for sensing the mark signal and furnishing a position signal corresponding to the position of said mark relative to a determined position in the horizontal direction. The position of the mark is determined relative to one extremity of a line already recorded on the reproduction carrier. Specifically, an oscillating mirror KS reflects an image of the distance between the first color component image AZ and mark Ma onto a diaphragm which is positioned in front of a photoreceiver D. The required lenses are not shown for the sake of clarity. While the photoreceiver D receives light signals indicative of the space between mark Ma and the end of the line of the color component image AZ, a sawtooth generator G generates a sawtooth voltage so that the final value of the sawtooth voltage constitutes the horizontal position signal to be processed by correction circuits KE.

Figure 6:
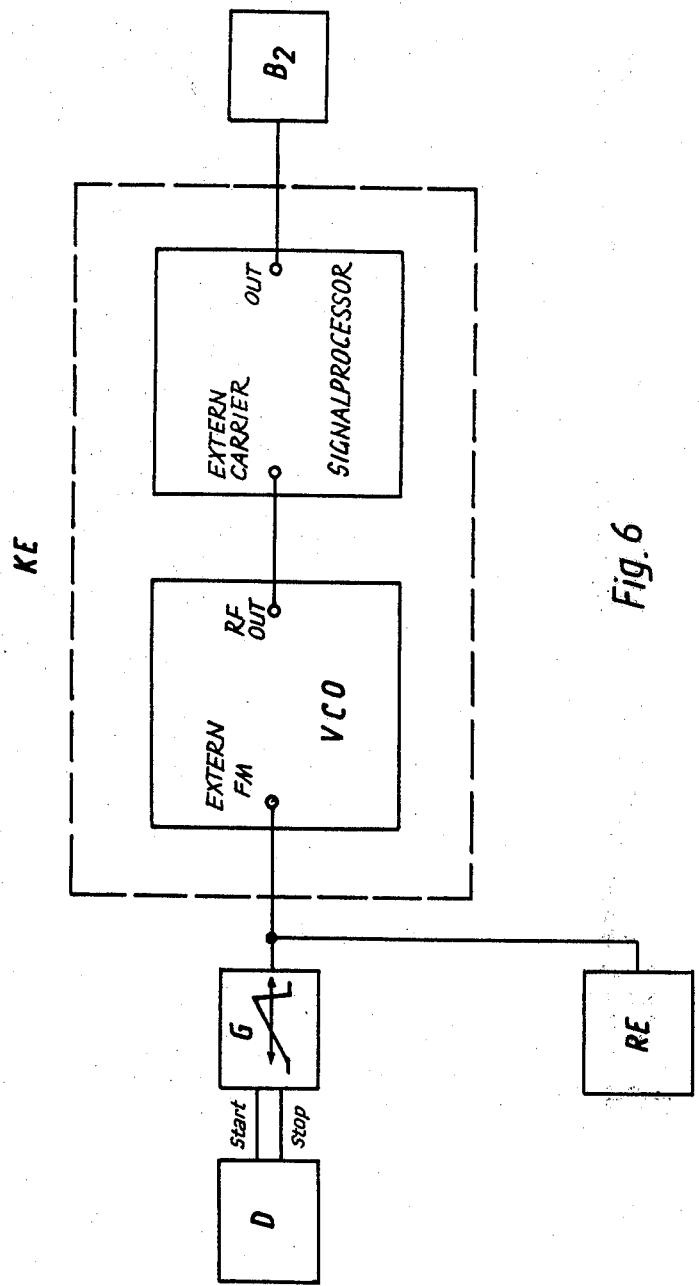
FIG. 6 is a more detailed block diagram of the circuitry of FIG. 5.

This is shown in greater detail in FIG. 6. The signal generated in photoreceiver D by the transition signal due to the sensing of the mark triggers a sawtooth generator G. The output of voltage generator G is stopped by the transition generated by photoreceiver D when starting the sensing of line AZ of the previously recorded color component image. The output of generator G at the time it is stopped controls a voltage controlled oscillator VCO, that is, the frequency of the RF output signal of the voltage controlled oscillator varies as a function of the voltage applied at its input. The output signal from the voltage controlled oscillator is applied to a modulator B2 which controls the deflection of the laser beam in the horizontal direction.

Figure 7:
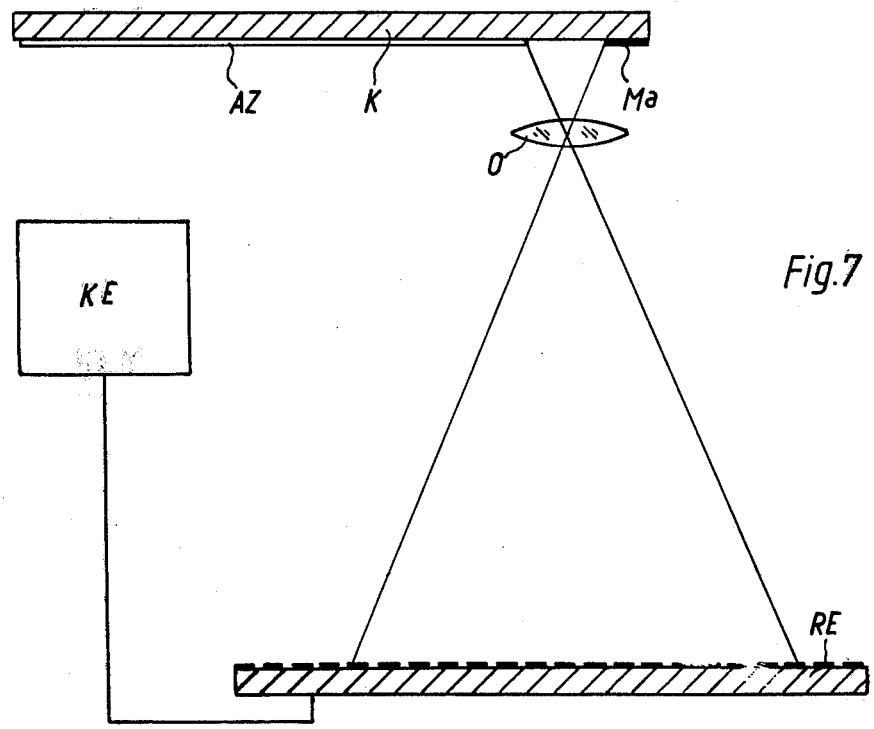
FIG. 7 is a schematic diagram of an alternate embodiment of the means shown in FIG. 5.

An alternate embodiment of the circuitry of FIG. 5 is shown in FIG. 7. The space between the mark Ma and the end of a line on the color component image AZ is enlarged by means of an objective O and projected onto a line of photodiodes RE. The correction signal is thus furnished in digital form, corresponding to the number of photodiodes receiving the light indicative of the space between the mark and the line of the color component image.

An image of the above-mentioned space can be projected onto a vidicon rather than onto the photodiodes RE. The correct horizontal deflection signal can then be devised by a combination of the line deflection current and the video signal.

The mark Ma can be recorded between sequential images during the retrace time of the scanner or while a new original is being supplied to the system.

For a preferred embodiment of the present invention in which the rotating mirror drums SR are absent, and the horizontal deflection is carried out by units B1, B2, and B3, position errors can be directly corrected by the deflection units.

For correction in the vertical direction, that is in the direction of transport of the reproduction carrier, acousto-optical intensity modulators A1, A2, and A3 are utilized. When the vertical deflection of the scanner is synchronized by a vertical trigger pulse, the deflection region covered by the modulators A1–A3 need correspond only to the distance between sequential lines.

In order to effect the correction in the direction of transport of the reproduction carrier, a sawtooth generator G is started when mark Ma is detected by detector D. Sawtooth generator G then continues furnishing a sawtooth signal until stopped by the vertical trigger pulse furnished by the electronic control circuit SE. The signal level of the sawtooth signal furnished by sawtooth generator G when stopped is the position signal and is applied to the correction circuits KE which in turn furnish corresponding signals to the deflection unit as described above in connection with the horizontal deflection correction.

As described above, the deflection units A1, A2, and A3 can serve simultaneously as intensity modulators. In this case the amplitude of the voltage applied to the deflection circuit controls the intensity of the beam while the frequency of the voltage applied to the circuits controls the deflection angle. The correction circuits KE must therefore comprise a generator for furnishing variable frequencies. The second set of deflection units, B2 and B3, respectively, operate in the direction perpendicular to the direction of deflection controlled by deflection units A1-A3 and are controlled in a similar manner.

It is further possible that mark Ma is recorded on the reproduction carrier prior to the time that the particular portion of the reproduction carrier arrives at the first recording station. In this case the marking means M at the first recording station are replaced by a detector D1 corresponding to detectors D2 and D3 at the second and third recording station, respectively.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a method for line-by-line recording of color component images on a reproduction carrier by means of a controlled beam wherein recording of a first color component image takes place at a first recording station and recording of a second color component image takes place at a second recording station separated from said first recording station by at least one further processing station, the improvement comprising the steps of creating a mark on said reproduction carrier indicative of the position of said first color component image; sensing said mark at said second recording station and creating a position signal corresponding to the position of said mark relative to a determined position; and fine positioning the raster of said beam at said second recording station in accordance with said position signal, whereby said second color component image is superimposed in registry upon said first color component image.

2. A method as set forth in claim 1, wherein said step of creating said mark comprises said mark at said first recording station, whereby said mark is indicative of the actual position of the raster of said first color component image.

3. A method as set forth in claim 1, wherein said step of creating said mark comprises creating said mark on said reproduction carrier prior to processing at said first recording station; further comprising the steps of scanning said mark at said first recording station and creating a further position signal corresponding to the position of said mark relative to a fixed position at said first recording station; and fine positioning said beam at said first recording station in accordance with said further position signal.

4. A method as set forth in claim 2, wherein said step of creating said mark on said reproduction carrier comprises illuminating said reproduction carrier with a light flash.

5. A method as set forth in claim 4, wherein scanning said mark comprises photoelectrically scanning said mark; and wherein said position signal is a photoelectrically generated electrical signal.

6. A method as set forth in claim 5, wherein said step of fine positioning the raster of said beam comprises electro-optically fine positioning the raster of said beam in accordance with said electrical position signal.

7. A method as set forth in claim 5, wherein said step of fine positioning the raster of said beam comprises acousto-optically fine positioning said raster in said accordance with said electrical position signal.

8. A method as set forth in claim 5, wherein the step of creating said electrical position signal comprises creating a first electrical position signal indicative of the distance of said mark from a predetermined position as measured in a first direction and creating a second electrical position signal indicative of the distance of said mark from said predetermined position as measured in a second direction perpendicular to said first direction; and wherein said step of fine positioning said raster comprises fine positioning said raster in said first direction in accordance with said first electrical position signal and in said second direction in accordance with said second electrical position signal.

9. A method as set forth in claim 1, wherein said reproduction carrier is transported in a predetermined direction from said first to said second recording station; and wherein said step of sensing said mark and creating a position signal comprises starting the creation of a sawtooth signal at a predetermined signal level upon sensing of said mark, stopping the creation of said sawtooth signal at a predetermined time instant relative to the deflection of said beam in said predetermined direction, whereby the value of said sawtooth signal at said predetermined time instant constitutes said position signal.

10. A method as set forth in claim 8, wherein said reproduction carrier is transported in a predetermined direction from said first to said second recording station; and wherein said step of sensing said mark and creating a position signal comprises starting the creation of a sawtooth signal at a predetermined signal level upon sensing of said mark, stopping the creation of said sawtooth signal at a predetermined time instant relative to the deflection of said beam in said predetermined direction, whereby the value of said sawtooth signal at said predetermined time instant constitutes said first position signal.

11. A method as set forth in claim 1, wherein said recording of said first color component image takes place along a plurality of lines; and wherein said step of sensing said mark and creating a position signal comprises creating a position signal having an amplitude corresponding to the distance between said mark and one extremity of said lines along the direction of said lines, and wherein said step of fine positioning comprises fine positioning said raster of said beam in the direction of said lines in accordance with said amplitude of said position signal.

12. A method as set forth in claim 11, wherein said step of creating said position signal having said amplitude comprises creating a sawtooth signal starting at a predetermined signal level upon sensing of said mark, scanning in the direction of said lines until an extremity of one of said lines is sensed, and stopping said creation of said sawtooth signal upon sensing of said extremity, whereby the final value of said sawtooth signal constitutes a position signal having said amplitude.

13. A method as set forth in claim 11, wherein said step of furnishing said position signal having said amplitude comprises optically enlarging the distance between said mark and one extremity of said lines and focussing the image of said distance onto a plurality of photoreceiver means arranged in a line, whereby the number of said photo receiver means receiving said image corresponds to said amplitude of said position signal.

14. In equipment for line-to-line recording of color component images on a reproduction carrier by means of a controlled recording beam wherein recording of a first color component image takes place at a first recording station by means of a first recording beam and recording of a second color component image takes place by means of a second recording beam at a second recording station separated from said first recording station, equipment for assuring registration of said second color component image with said first color component image, comprising, in combination, means for creating a mark on said reproduction carrier indicative of the position of said first color component image; sensing means at said second recording station for sensing said mark and creating a position signal corresponding to the position of said mark relative to a determined position; and fine positioning means for positioning the raster of said second recording beam when creating said second color component image in accordance with said position signal.

15. Equipment as set forth in claim 14, wherein said means for creating said mark are located at said first recording station, whereby said mark is indicative of the actual position of said first color component image.

16. Equipment as set forth in claim 14, wherein said means for creating a mark comprise means for creating a mark on said reproduction carrier prior to processing of said reproduction carrier at said first recording station; further comprising sensing means at said first recording station for sensing said mark and creating a further position signal corresponding to the position of said mark relative to a predetermined position, and final positioning means for adjusting the position of the raster of said beam while creating said first color component image in accordance with said position signal.

17. Equipment as set forth in claim 15; further comprising first and second deflection control means located respectively at said first and second recording station for respectively controlling the deflection of said first and second recording beam; and wherein said means for creating a mark comprises a flashbulb connected to said first deflection control means for activation by the latter.

18. Equipment as set forth in claim 16, wherein said sensing means comprise a photoelectric sensing means and said position signal is an electrical position signal; and wherein said deflection control means comprise electro-optical deflection control means operative under control of said electrical position signal.

19. Equipment as set forth in claim 17, wherein said sensing means comprise photoelectric sensing means and said position signal is an electrical position signal; and wherein said deflection control means comprise acousto-optical deflection control means operative under control of said electrical position signal.

20. Equipment as set forth in claim 17, wherein said first and second deflection control means each comprise horizontal deflection control means deflecting the respective beam along predetermined lines and vertical deflection control means for deflecting the respective beam in a direction perpendicular to said lines.

21. Equipment as set forth in claim 20 wherein said horizontal and vertical deflection control means adjoin each other in the paths of the respective beams.

22. Equipment as set forth in claim 20, wherein said vertical deflection means further constitute means for modulating the intensity of said beam during deflection along said lines, thereby creating said color component image.

23. Equipment as set forth in claim 20, wherein said vertical deflection control means comprise the furnishing a vertical deflection trigger pulse; and wherein said sensing means comprise sawtooth oscillator means furnishing a sawtooth voltage, means for starting said sawtooth generator means in response to the sensing of said mark, and means for stopping said sawtooth generator means in response to said vertical trigger pulse.

24. Equipment as set forth in claim 18 wherein said sensing means comprising a line of photo diodes, means for creating an image of the distance between said mark and an extremity of one of said lines on said line of photo diodes, whereby the number of photo diodes receiving said image constitutes said position signal.

* * * * *